(12) United States Patent
Sugawara et al.

(10) Patent No.: US 9,235,472 B2
(45) Date of Patent: Jan. 12, 2016

(54) DRIVE ARRAY APPARATUS, CONTROLLER, DATA STORAGE APPARATUS AND METHOD FOR REBUILDING DRIVE ARRAY

(71) Applicant: KABUSHIKI KAISHA TOSHIBA, Tokyo (JP)

(72) Inventors: Nobuhiro Sugawara, Yokohama (JP); Hironori Kanno, Fussa (JP); Yasuyuki Nagashima, Yokohama (JP); Seiji Toda, Kawasaki (JP); Kotaro Yamamoto, Tokyo (JP); Masahide Kanegae, Fujisawa (JP); Keiichi Yorimitsu, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 191 days.

(21) Appl. No.: 14/018,099

(22) Filed: Sep. 4, 2013

(65) Prior Publication Data
US 2014/0304547 A1 Oct. 9, 2014

(30) Foreign Application Priority Data
Apr. 5, 2013 (JP) ................... 2013-079372

(51) Int. Cl.
*G06F 11/00* (2006.01)
*G06F 11/10* (2006.01)

(52) U.S. Cl.
CPC ........ *G06F 11/1092* (2013.01); *G06F 11/1076* (2013.01); *G06F 2211/1059* (2013.01)

(58) Field of Classification Search
CPC .................................................. G06F 11/1076
See application file for complete search history.

(56) References Cited

U.S. PATENT DOCUMENTS

| 7,293,193 | B2 | 11/2007 | Tanaka et al. | |
| 7,587,631 | B2 | 9/2009 | Shimmitsu | |
| 8,473,777 | B1 * | 6/2013 | Rangachari et al. | ......... 714/6.12 |
| 2008/0010500 | A1 | 1/2008 | Shimmitsu | |
| 2014/0068182 | A1 * | 3/2014 | Terry | ............ 711/114 |

FOREIGN PATENT DOCUMENTS

| JP | 2005-107839 | 4/2005 |
| JP | 2007-087109 | 4/2007 |
| JP | 2007-334593 | 12/2007 |
| JP | 4821448 | 9/2011 |

* cited by examiner

*Primary Examiner* — Amine Riad
(74) *Attorney, Agent, or Firm* — Knobbe Martens Olson & Bear LLP

(57) ABSTRACT

According to one embodiment, a drive array apparatus includes a plurality of data storage drives constituting a drive array and a controller. The controller divides all data storage areas of each of the data storage drives into a plurality of logical unit areas and associates and manages each of the logical unit areas and each of the data storage drives. The controller identifies a logical unit area of an error occurrence object based on a notification from a data storage drive where an error occurred, restores data of the identified logical unit area, and performs reconfiguration processing of the drive array.

15 Claims, 6 Drawing Sheets

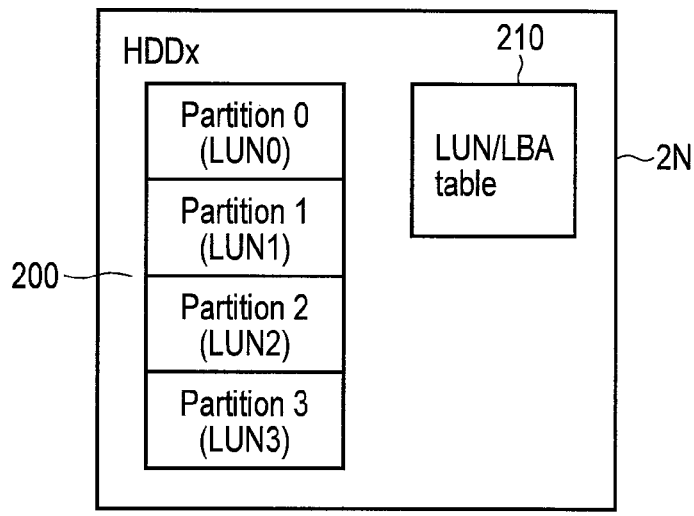
FIG. 3
| | | | | | | | | | | |
|---|---|---|---|---|---|---|---|---|---|---|
| LUN0 Head 0 | LBA0 | 1 | 2 | 3 | 4 | 5 | 6 | 7 | ... | 3FFF |
| LUN1 Head 1 | LBA0 | 1 | 2 | 3 | 4 | 5 | 6 | 7 | ... | 3FFF |
| LUN2 Head 2 | LBA0 | 1 | 2 | 3 | 4 | 5 | 6 | 7 | ... | 3FFF |
| LUN3 Head 3 | LBA0 | 1 | 2 | 3 | 4 | 5 | 6 | 7 | ... | 3FFF |
~210
FIG. 4
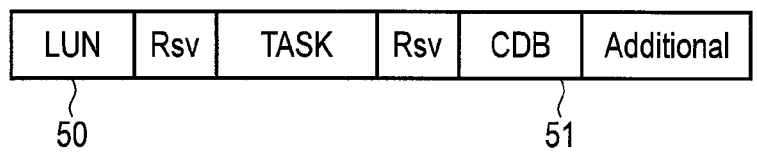
FIG. 5

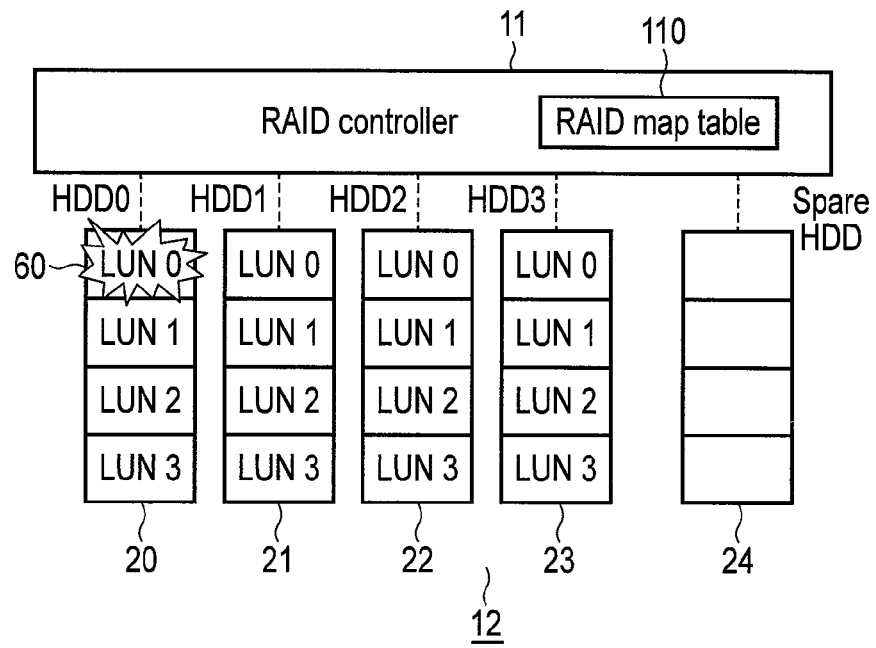
F I G. 6
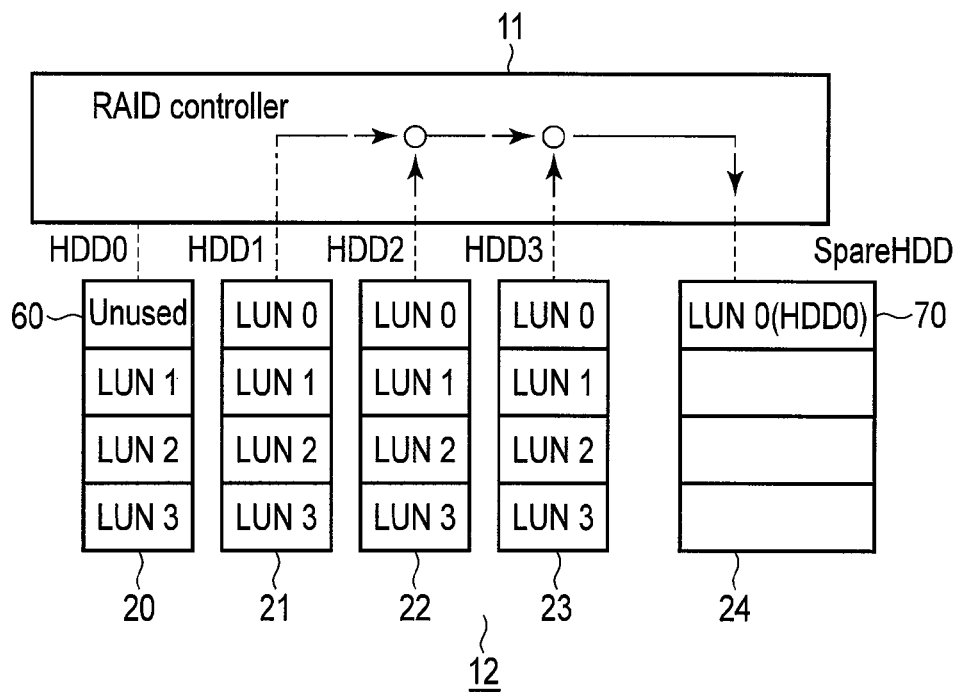
F I G. 7

| | HDD number | | | | |
|---|---|---|---|---|---|
| | 0 | 1 | 2 | 3 | HS |
| LUN 0 | MFC | Act | Act | Act | Act (HDD 0) |
| 1 | Act | Act | Act | Act | OPR (HDD x) |
| 2 | Act | Act | Act | Act | OPR (HDD x) |
| 3 | Act | Act | Act | Act | OPR (HDD x) |
F I G. 8
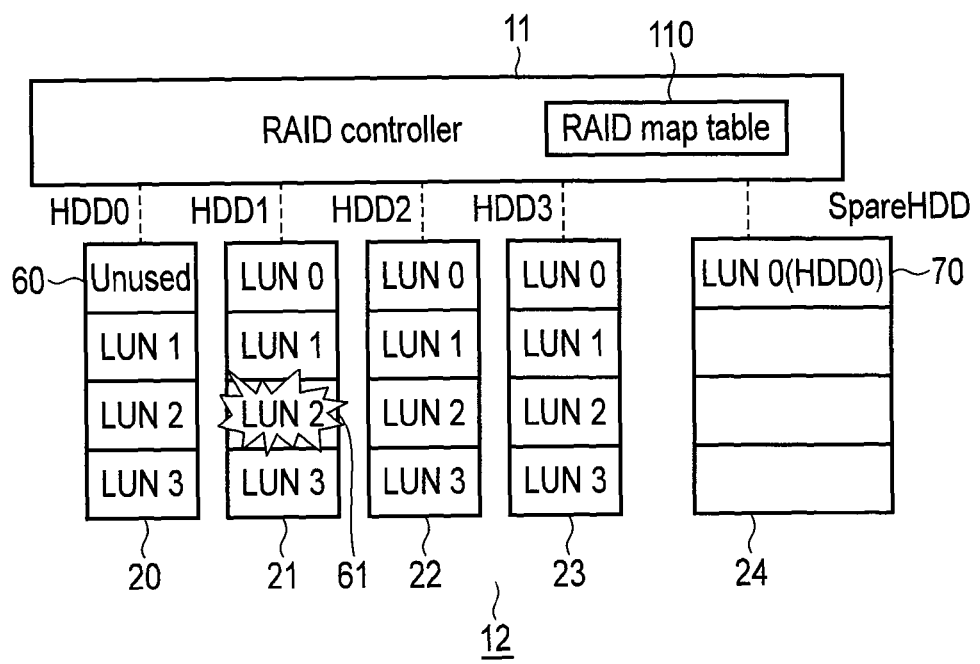
F I G. 9

DRIVE ARRAY APPARATUS, CONTROLLER, DATA STORAGE APPARATUS AND METHOD FOR REBUILDING DRIVE ARRAY

CROSS-REFERENCE TO RELATED APPLICATIONS

This application is based upon and claims the benefit of priority from Japanese Patent Application No. 2013-079372, filed Apr. 5, 2013, the entire contents of which are incorporated herein by reference.

FIELD

Embodiments described herein relate generally to a drive array apparatus, a controller, a data storage apparatus, and a method for rebuilding a drive array.

BACKGROUND

In recent years, still larger capacities of storage systems managed by, for example, a server are pushed forward. To build a large-capacity storage system, a drive array apparatus capable of realizing high reliability and high performance is indispensable. The drive array apparatus is also called a RAID (Redundant Array of Independent Disks) apparatus or a disk array apparatus. The drive array apparatus may be denoted as the RAID apparatus below.

Normally, a RAID apparatus includes a plurality of hard disk drives (HDDs). In recent years, a hybrid configuration using a plurality of HDDs and SSDs (solid state drives) is also developed for a RAID apparatus. Incidentally, HDD and SSD may generically be denoted as the data storage drive.

When a specific storage area of a constituent HDD fails, a RAID apparatus restores data recorded in the storage area and copies all data of the HDD to a spare data storage drive (hereinafter, simply a spare drive). The RAID apparatus can be reconfigured by such rebuilding.

When a RAID apparatus is reconfigured by rebuilding as described above, an HDD in which a failure has occurred in a specific storage area is made unavailable and the HDD is replaced by another HDD. Thus, the execution time needed for rebuilding including the work time for HDD replacement increases, leading to a heavy burden of storage system operation including the cost of HDD replacement. Against such a background, improved RAID apparatuses allowing continued use of an HDD have been proposed.

A conventional improved RAID apparatus uses a management table that manages the storage area (accessed by LBA) for each head of each HDD to perform rebuilding that restores data of the storage area corresponding to a failed head. Such rebuilding allows continued use of HDDs by inhibiting HDD replacement. However, such rebuilding requires a large-capacity management table that manages all LBA corresponding to each head and a great deal of time is needed for processing to reference and update the management table. Therefore, while the continued use of HDDs is possible, the execution time needed for rebuilding may not be reducible in the end.

BRIEF DESCRIPTION OF THE DRAWINGS

FIG. 3 is a diagram for explaining relationship between data storage areas and LUN of an HDD according to the embodiment;

FIG. 4 is a diagram for explaining configuration of a LUN/LBA table according to the embodiment;

FIG. 5 is a diagram for explaining configuration of an SSP command frame according to the embodiment;

FIG. 6 is a block diagram for explaining configuration of a RAID configuration when an error occurs according to the embodiment;

FIG. 7 is a block diagram for explaining rebuilding according to the embodiment;

FIG. 8 is a diagram for explaining an example of a RAID map table according to the embodiment;

FIG. 9 is a block diagram for explaining the RAID configuration when an error occurs according to the embodiment;

DETAILED DESCRIPTION

In general, according to one embodiment, a drive array apparatus includes a plurality of data storage drives constituting a drive array and a controller. The controller divides all data storage areas of each of the data storage drives into a plurality of logical unit areas and associates and manages each of the logical unit areas and each of the data storage drives. The controller identifies a logical unit area of an error occurrence object based on a notification from a data storage drive where an error occurred, restores data of the identified logical unit area, and performs reconfiguration processing of the drive array.

Various embodiments will be described hereinafter with reference to the accompanying drawings.

[System Configuration]

Figure 1:
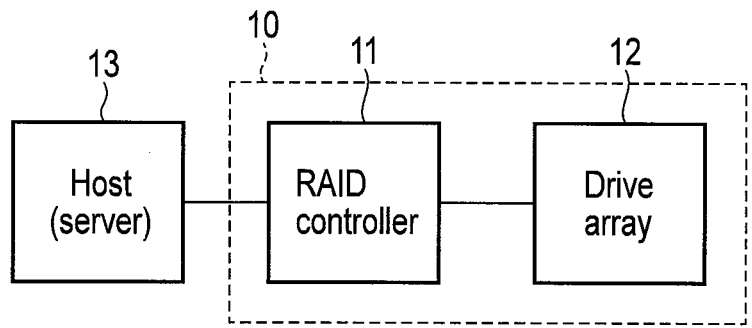
FIG. 1 is a block diagram for explaining configuration of a system according to an embodiment.

As shown in FIG. 1, a storage system according to the present embodiment mainly includes a RAID apparatus 10 and a host (server) 13. The server 13 is a computer which accesses the RAID apparatus 10 as a large-capacity data storage apparatus.

The RAID apparatus 10 includes a RAID controller 11 and a drive array 12. The RAID controller 11 manages the configuration of the drive array 12 and controls the drive array 12 in accordance with the command from the server 13. Incidentally, the RAID controller 11 may be a module called a RAID card provided on the host 13 side.

Figure 2:
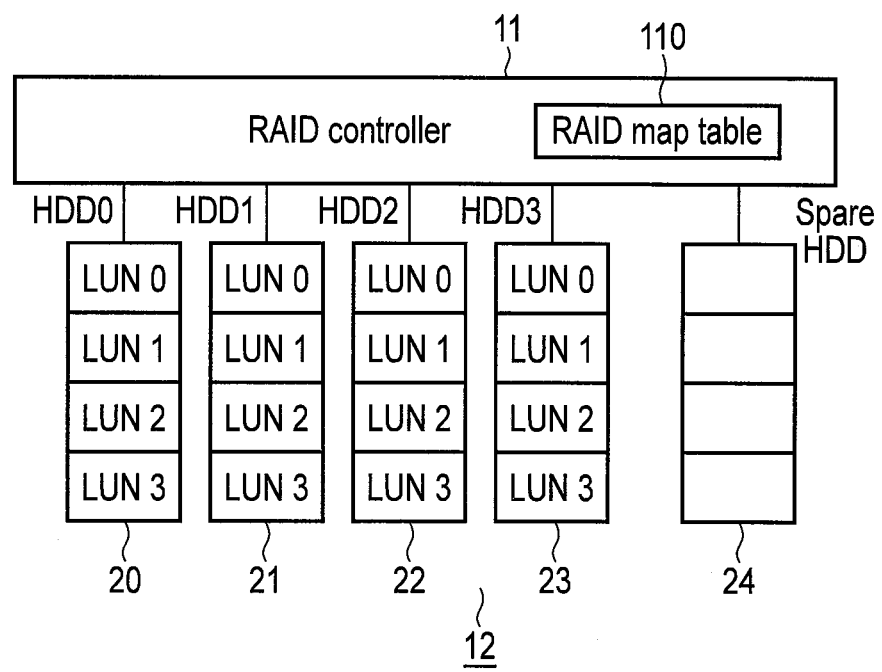
FIG. 2 is a block diagram for explaining configuration of a RAID apparatus according to the embodiment.

As shown in FIG. 2, the RAID controller 11 has, as will be described later, a RAID map table 110 to manage the configuration of the drive array 12 stored in an internal storage apparatus. The drive array 12 is configured by a plurality of data storage drives. In the present embodiment, the hard disk drive (HDD) is applied as a data storage drive. Incidentally, the present embodiment can also be applied to a hybrid configuration in which HDDs and SSDs (solid state drives) are used as a plurality of data storage drives. For the sake of convenience, the drive array 12 in the present embodiment is configured by four HDDs (HDD0 to HDD3) 20 to 23 and a standby HDD called a spare drive (spare HDD) 24.

As shown in FIG. 3, the RAID controller 11 manages an entire data storage area 200 of an HDD 2N (N=0 to 4, HDDx), i.e., one of the HDDs 20 to 24 including the spare drive 24, by dividing the entire data storage area into, for example, four partitions (Partition0 to Partition4) and allocating logical unit numbers (LUN).

For the sake of convenience, LUN0 to LUN3 corresponding to data storage areas divided into four partitions are allocated to each HDD 2N. Further, the HDD 2N includes four heads 0 to 3 and a logical address (hereinafter, LBA: Logical Block Address) is allocated to each data storage area (that is, each disk surface). In the present embodiment, LUN0 to LUN3 correspond to all LBA of the heads 0 to 3, respectively. If a data storage area corresponding to LUN in each HDD 2N fails, data can be restored using data corresponding to the LUN in other HDDs. Incidentally, the present embodiment can also be applied to an SSD in which no head is present as a data storage drive. In this case, LUN may be a logical unit number indicating a logical unit area corresponding to a data storage area (that is, for example, a nonvolatile memory chip) that is independent of the head.

The HDD 2N stores a LUN/LBA table 210 in which LUN and LBA are associated. When, for example, as shown in FIG. 4, LUN0 to LUN3 are allocated to each of the heads 0 to 3, the LUN/LBA table 210 has a table configuration in which all corresponding LBAs are associated with each of LUN0 to LUN3. The RAID controller 11 is notified of content of the LUN/LBA table 210 from the HDD 2N via an interface. That is, the number of constituent LUN of each HDD and the number of LBA corresponding to each LUN are notified. Accordingly, the RAID controller 11 can manage reading and writing of data for each LUN for all HDDs including the spare drive 24. In the present embodiment, the interface between the RAID controller 11 and the drive array 12 is, for example, an SAS (Serial Attached SCSI) interface.

To access the drive array 12, the RAID controller 11 selects the HDDs 20 to 24 (using an OPEN ADDRESS frame) via the SAS interface and specifies the command to be executed by an SSP (Serial SCSI Protocol) command frame. The SSP command frame is also simply called the SSP frame and contains a header and a command information unit (CIU). More specifically, as shown in FIG. 5, a header 50 of the SSP frame contains, for example, an 8-bit specifying section that specifies LUN. The CIU contains, in addition to a reserved section, a task section, and an additional section, a command descriptor block (CDB) 51. The CDB 51 is a command instruction section for instructing the command, such as a read or write.

Further, as shown in FIG. 8, the RAID controller 11 includes the RAID map table 110. The RAID controller 11 updates the RAID map table 110 by performing rebuilding to reconfigure the RAID apparatus. The RAID map table 110 has status information showing the status of each LUN by associating each LUN and each HDD.

In the RAID map table 110, "HS" other than HDD numbers 0 to 3 is a code indicating the spare drive 24. The status information includes Act (Active), OPR (Operative), MFC (Malfunction), OPR (Operative), OFL (Offline), SWP (Swapping), and IPR (Inoperative). "Act" indicates that the applicable LUN is incorporated as a portion of the drive array 12. "OPR" indicates that the applicable HDD is operable. "MFC" indicates that the applicable LUN is in a failed state. "OFL" indicates that the applicable HDD is offline. "SWP" indicates that the applicable LUN is being swapped. "IPR" indicates that the applicable HDD is not physically present. In the HS (spare drive 24), "HDD x" indicates that data of HDD x (x: 0 to 3) is being swapped (SWP).

[Reconfiguration of the RAID Apparatus]

Rebuilding in the present embodiment will be described below with reference to FIGS. 6 to 12.

As shown in FIG. 6, a failure (hereinafter, denoted as an error) in which, for example, a reproduction error of data frequently occurs in a specific data storage area 60 of, for example, the HDD 20 (HDD0) may occur in the drive array 12. In this case, processing to restore data determined to be an error is performed. The processing will be described with reference to FIG. 12.

Figure 12:
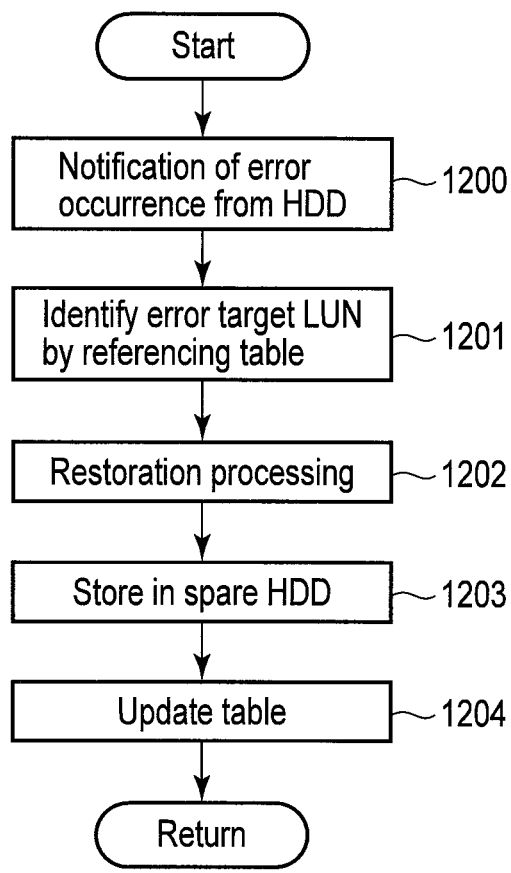
FIG. 12 is a flow chart for explaining rebuilding according to the embodiment.

As shown in FIG. 12, the HDD 20 notifies the RAID controller 11 of an error occurrence via an interface (block 1200). In this case, the HDD 20 notifies the RAID controller 11 of LUN (LUN0) and LBA of the data storage area 60 where an error occurred by referring to the LUN/LBA table 210.

The RAID controller 11 identifies the HDD number (HDD0) and LUN (LUN0) of the error occurrence object based on the notification from the HDD 20 and the reference to the RAID map table 110 (block 1201). The RAID controller 11 performs rebuilding for the identified HDD 20 and LUN0.

More specifically, as shown in FIG. 7, the RAID controller 11 restores data recorded in the data storage area 60 where an error occurred by reading data (including ECC) of each LUN0 stored in the other HDDs 21 to 23 (block 1202). The drive array 12 is configured as a RAID by the method of, for example, RAID level 5. The RAID controller 11 rebuilds data corresponding to the restored LUN0 of the HDD 20 in the spare drive 24 by copying (swapping) the data to a specific data storage area 70 of the spare drive 24 (block 1203).

After performing the rebuilding, as shown in FIG. 8, the RAID controller 11 updates the RAID map table 110 (block 1204). That is, the status "MFC" indicating that LUN0 of the HDD 20 (HDD0) as an error occurrence object is in a failed state is set to the RAID map table 110. Also, the status "Act" indicating that LUN0 of the spare drive 24 (HS) is incorporated as a portion of the drive array 12 is set to the RAID map table 110. In this case, the status "HDD0" indicating that data is swapped from the HDD 20 (HDD0) is also set to LUN0 for the spare drive 24 (HS).

By performing the rebuilding described above, as shown in FIG. 7, the drive array 12 is reconfigured. More specifically, the data storage area 60 corresponding to LUN0 of the HDD 20 is set as an unused area. The RAID controller 11 accesses, instead of LUN0 of the HDD 20, the data storage area 70 corresponding to LUN0 of the spare drive 24.

Similarly, as shown in FIG. 9, a case when an error occurred in a specific data storage area 61 of, for example, the HDD 21 will be described.

The HDD 21 notifies the RAID controller 11 of an error occurrence via an interface. The RAID controller 11 identifies the HDD number (HDD1) and LUN (LUN2) of the error occurrence object based on the notification from the HDD 21 and the reference to the RAID map table 110. The RAID controller 11 performs rebuilding for the identified HDD 21 and LUN2.

Figures 10, 11:
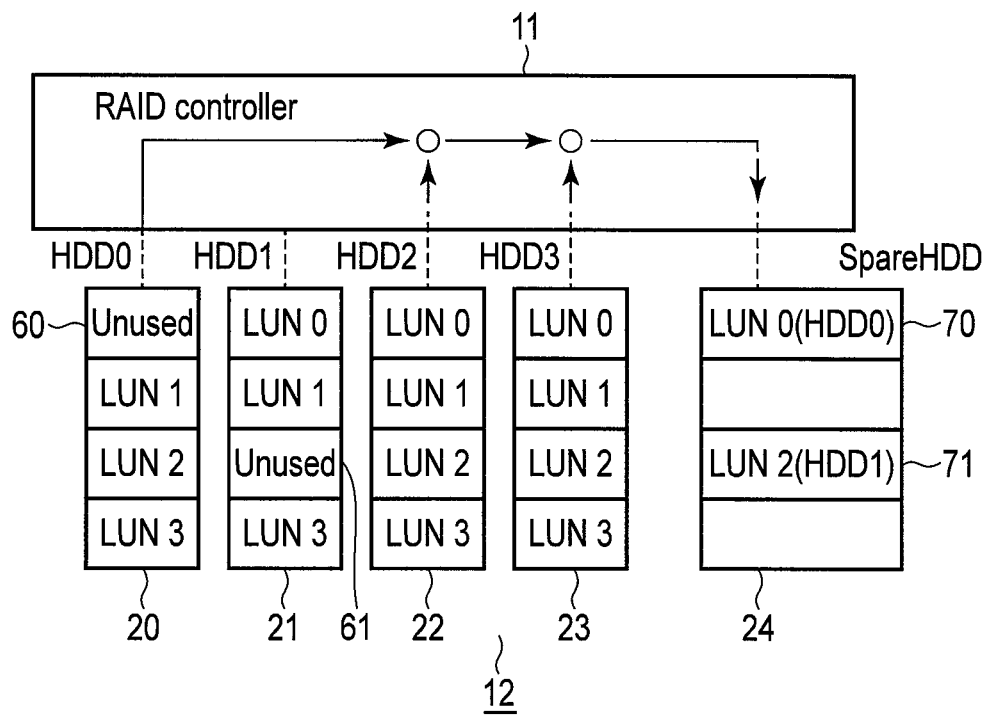
FIG. 10 is a block diagram for explaining rebuilding according to the embodiment.
FIG. 11 is a diagram for explaining an example of the RAID map table according to the embodiment.

That is, as shown in FIG. 10, the RAID controller 11 restores data recorded in the data storage area 61 where an error occurred by reading data (including ECC) of each LUN2 stored in the other HDDs 20, 22, 23. The RAID controller 11 rebuilds data corresponding to the restored LUN2 of the HDD 21 in the spare drive 24 by copying (swapping) the data to a specific data storage area 71 of the spare drive 24.

After performing the rebuilding, as shown in FIG. 11, the RAID controller 11 updates the RAID map table 110. That is, the status "MFC" indicating that LUN2 of the HDD 21 (HDD1) as an error occurrence object is in a failed state is set to the RAID map table 110. Also, the status "Act" indicating that LUN2 of the spare drive 24 (HS) is incorporated as a portion of the drive array 12 is set to the RAID map table 110. In this case, the status "HDD1" indicating that data is swapped from the HDD 21 (HDD1) is also set to LUN2 of the spare drive 24 (HS).

By performing the rebuilding described above, as shown in FIG. 10, the drive array 12 is reconfigured. More specifically, the data storage area 61 corresponding to LUN2 of the HDD 21 is also set, along with the data storage area 60 corresponding to LUN0 of the HDD 20, as an unused area. Like the case of LUN0 of the HDD 20, the RAID controller 11 accesses, instead of LUN2 of the HDD 21, the data storage area 71 corresponding to LUN2 of the spare drive 24.

According to the present embodiment, as described above, the data storage area of each HDD is managed by LUN in the drive array 12 and thus, an area where an error occurred can be identified by LUN. Therefore, rebuilding can be performed for each LUN and there is no need to replace, for example, one HDD unit so that the man-hours of work needed for rebuilding can significantly be reduced. Accordingly, the time needed for rebuilding necessary to reconfigure a RAID can be reduced and continued use of each HDD can be realized.

Further, according to the method in the present embodiment, instead of identifying the head where an error occurred and performing rebuilding based on LBA corresponding to the head, the rebuilding unit is LUN. Thus, the RAID controller 11 in the present embodiment has the RAID map table 110 associating HDD and LUN without needing a vast amount of table information to search for all LBA corresponding to the head as an error occurrence object. Therefore, the RAID controller 11 in the present embodiment can easily identify an error location to be rebuilt.

On the other hand, the LUN/LBA table 210 is stored in each HDD. In other words, according to the present embodiment, table information needed for rebuilding can be divided into the RAID map table 110 and the LUN/LBA table 210 to be distributed between the RAID controller and each HDD. Thus, table information managed by the RAID controller 11 can be minimized.

The RAID reconfiguration using the spare drive 24 is described in the present embodiment, but the present embodiment is not limited to such an example and a method of realizing the RAID reconfiguration using an HDD other than the HDD as an error occurrence object can also be utilized.

Also in the present embodiment, a case of the RAID configuration of, for example, the RAID level 5 is described, but the present embodiment is not limited to such an example and can also be applied when the RAID configuration has other RAID levels. Further, the interface is not limited to the SAS interface and the present embodiment can also be applied when other interface standards are adopted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A drive array apparatus comprising:
   data storage drive; and
   a controller configured to
      divide a data storage area of each of the data storage drives into a plurality of logical unit areas;
      store first information associating each of the data storage drives and each of the logical unit areas;
      identify a logical unit area of an error occurrence object based on a notification from an error occurrence data storage drive and the first information; and
      restore data of the identified logical unit area.

2. The drive array apparatus of claim 1, wherein
   the first information comprises information indicating that the logical unit area of the error occurrence object is unused as the data storage area.

3. The drive array apparatus of claim 1, wherein the controller is configured to further
   store the restored data in a data storage drive different from the error occurrence data storage drive.

4. The drive array apparatus of claim 1, further comprising:
   a standby data storage drive configured to store the restored data,
   wherein the controller is configured to further
   store the restored data in the standby data storage drive.

5. The drive array apparatus of claim 1, wherein
   each of the data storage drives is configured to associate a logical address to access the data storage area with the logical unit area, and
   the controller is configured to further
   identify the logical unit area of the error occurrence object based on the notification of information indicating the logical unit area corresponding to the logical address of the data storage area of the error occurrence object from the data storage drive where the error occurred.

6. A controllers for a drive array apparatus comprising data storage drive, the controller comprising:
   a processor configured to:
      divide a data storage area of each of the data storage drives into a plurality of logical unit areas;
      store first information associating each of the data storage drives and each of the logical unit areas;
      identify a logical unit area of an error occurrence object based on a notification from an error occurrence data storage drive and the first information; and
      restore data of the identified logical unit area.

7. The controller of Claim 6, wherein
   the first information comprises information indicating that the logical unit area of the error occurrence object is unused as the data storage area.

8. The controller of claim 6, wherein
   the controller is configured to further
   store the restored data in a data storage drive different from the error occurrence data storage drive.

9. The controller of claim 6, further comprising:
   a standby data storage drive configured to store the restored data,
   wherein the controller is configured to further
   store the restored data in the standby data storage drive.

10. The controller of claim 6, wherein
    each of the data storage drives is configured to associate a logical address to access the data storage area with the logical unit area, and
    the controller is configured to further
    identify the logical unit area of the error occurrence object based on the notification of information indicating the logical unit area corresponding to the logical address of the data storage area of the error occurrence object from the data storage drive where the error occurred.

11. A method for a drive array apparatus comprising data storage drives, the method comprising:
    dividing a data storage area of each of the data storage drives into a plurality of logical unit areas;

storing first information associating each of the data storage drives and each of the logical unit areas;

identifying a logical unit area of an error occurrence object based on a notification from an error occurrence data storage drive and the first information; and restoring data of the identified logical unit area.

12. The method of claim 11, wherein:

the first information comprises information indicating that the logical unit area of the error occurrence object is unused as the data storage area.

13. The method of claim 11, further comprising:

storing the restored data in a data storage drive different from the error occurrence data storage drive.

14. The method of claim 11, the drive array apparatus further comprising:

a standby data storage drive configured to store the restored data, the method further comprising:

storing the restored data in the standby data storage drive.

15. The method of claim 11, wherein each of the data storage drives is configured to associate a logical address to access the data storage area with the logical unit area, the method further comprising:

identifying the logical unit area of the error occurrence object based on the notification of information indicating the logical unit area corresponding to the logical address of the data storage area of the error occurrence object from the data storage drive where the error occurred.

* * * * *